No. 640,171. Patented Jan. 2, 1900.
G. A. BARNES.
BOX MACHINE.
(Application filed Sept. 10, 1898.)
(No Model.) 10 Sheets—Sheet 1.
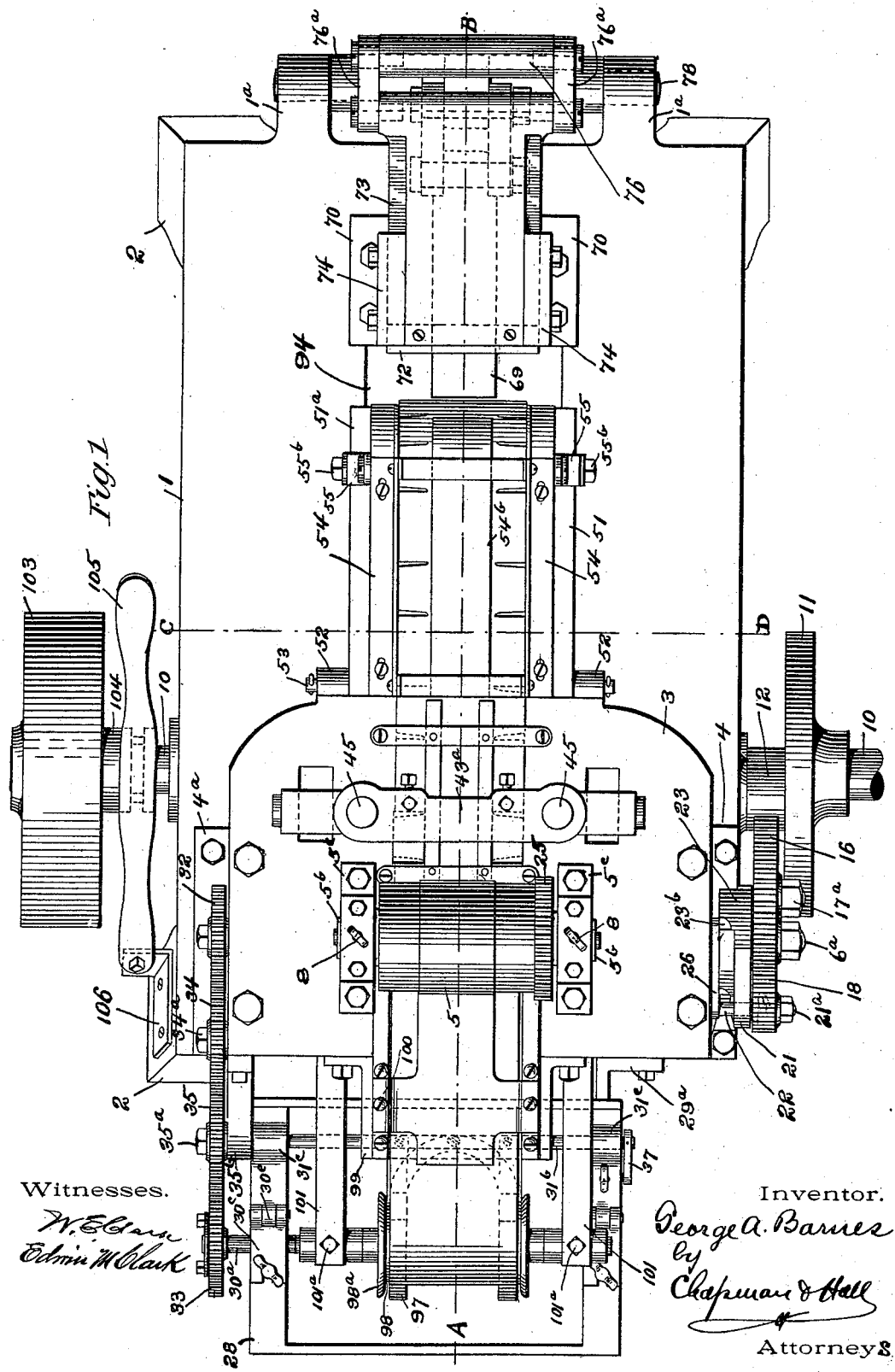
Witnesses. Inventor.
George A. Barnes
by
Chapman & Hall
Attorneys

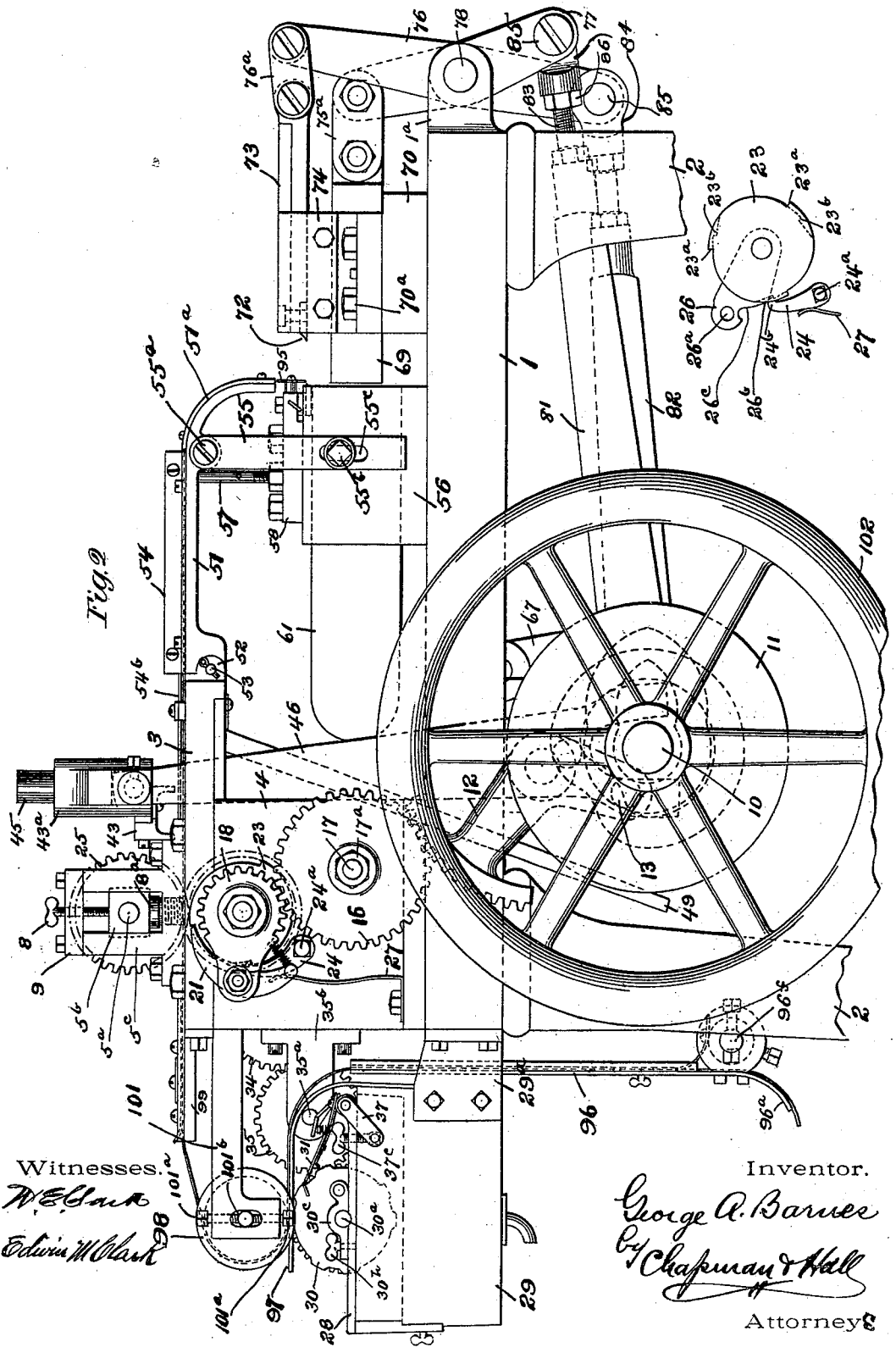

No. 640,171. Patented Jan. 2, 1900.
G. A. BARNES.
BOX MACHINE.
(Application filed Sept. 10, 1898.)
(No Model.) 10 Sheets—Sheet 3.
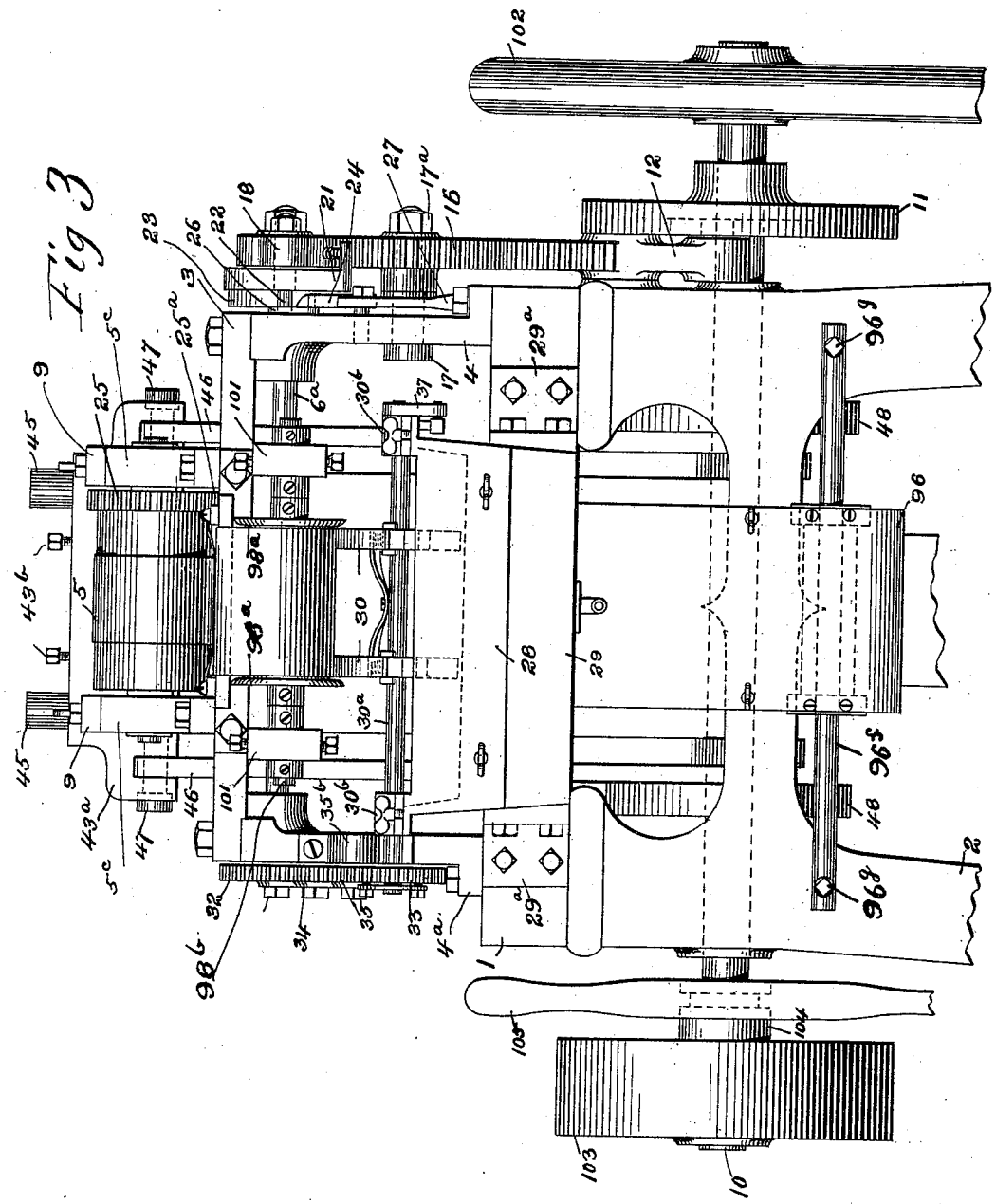
Witnesses.
W. E. Clark
Edwin M. Clark
Inventor.
George A. Barnes
by
Chapman & Hall
Attorneys No. 640,171. Patented Jan. 2, 1900.
G. A. BARNES.
BOX MACHINE.
(Application filed Sept. 10, 1898.)
(No Model.) 10 Sheets—Sheet 4.
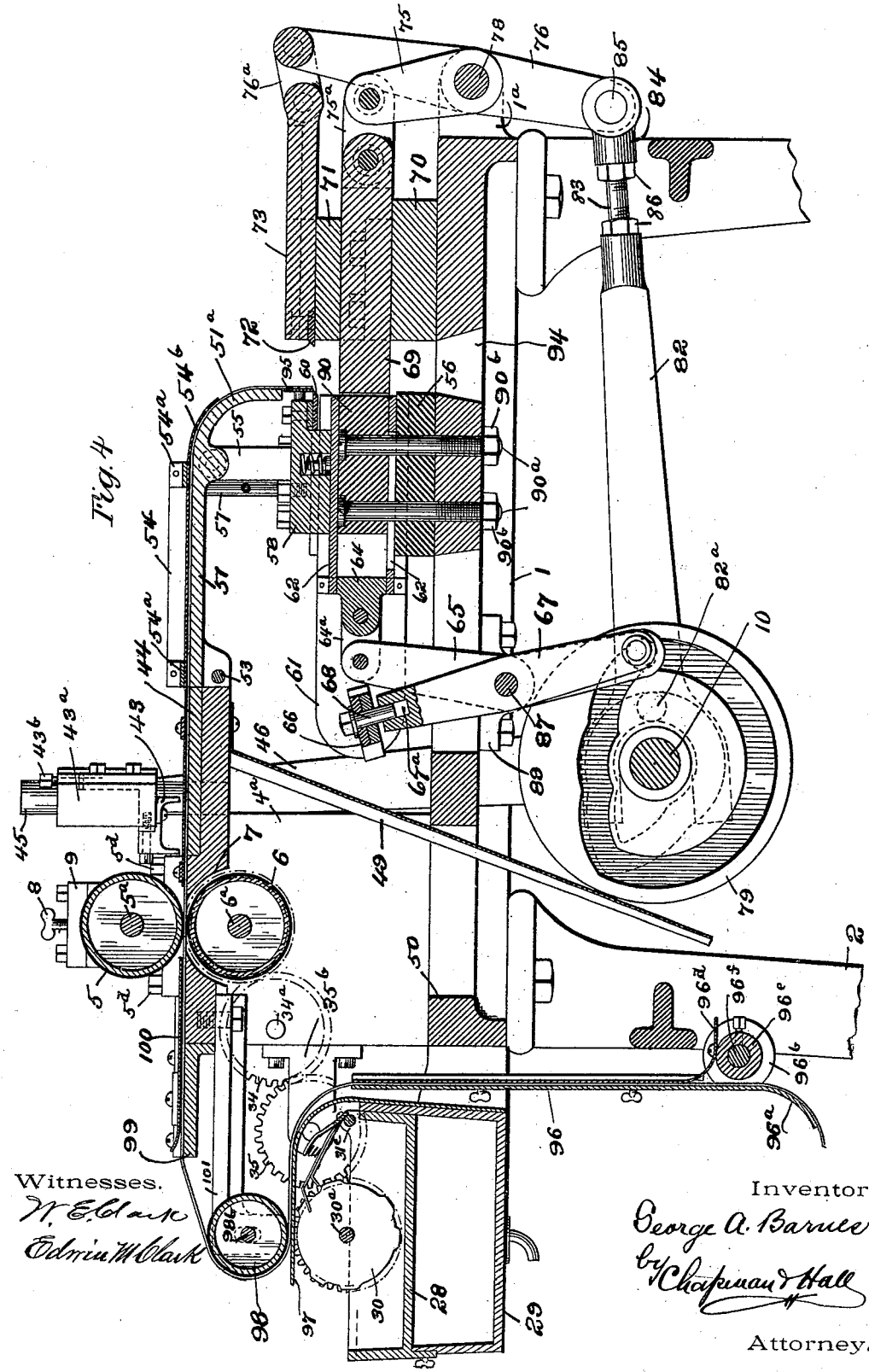
Witnesses.
W. E. Clark
Edwin M. Clark
Inventor.
George A. Barnes
by Chapman & Hall
Attorneys No. 640,171. Patented Jan. 2, 1900.
G. A. BARNES.
BOX MACHINE.
(Application filed Sept. 10, 1898.)
(No Model.) 10 Sheets—Sheet 5.
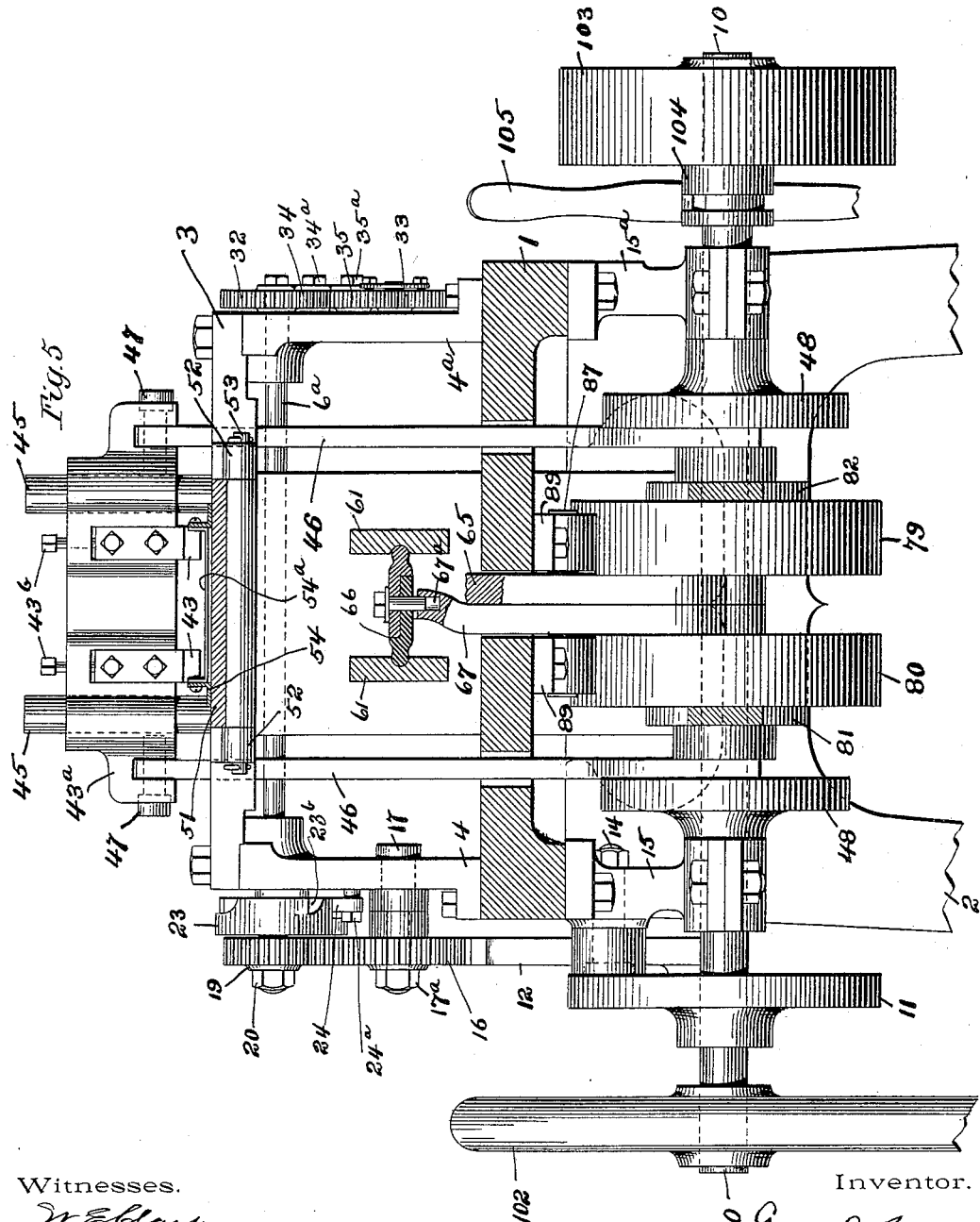
Witnesses. Inventor.
George A. Barnes,
by Chapman & Hall
Attorneys

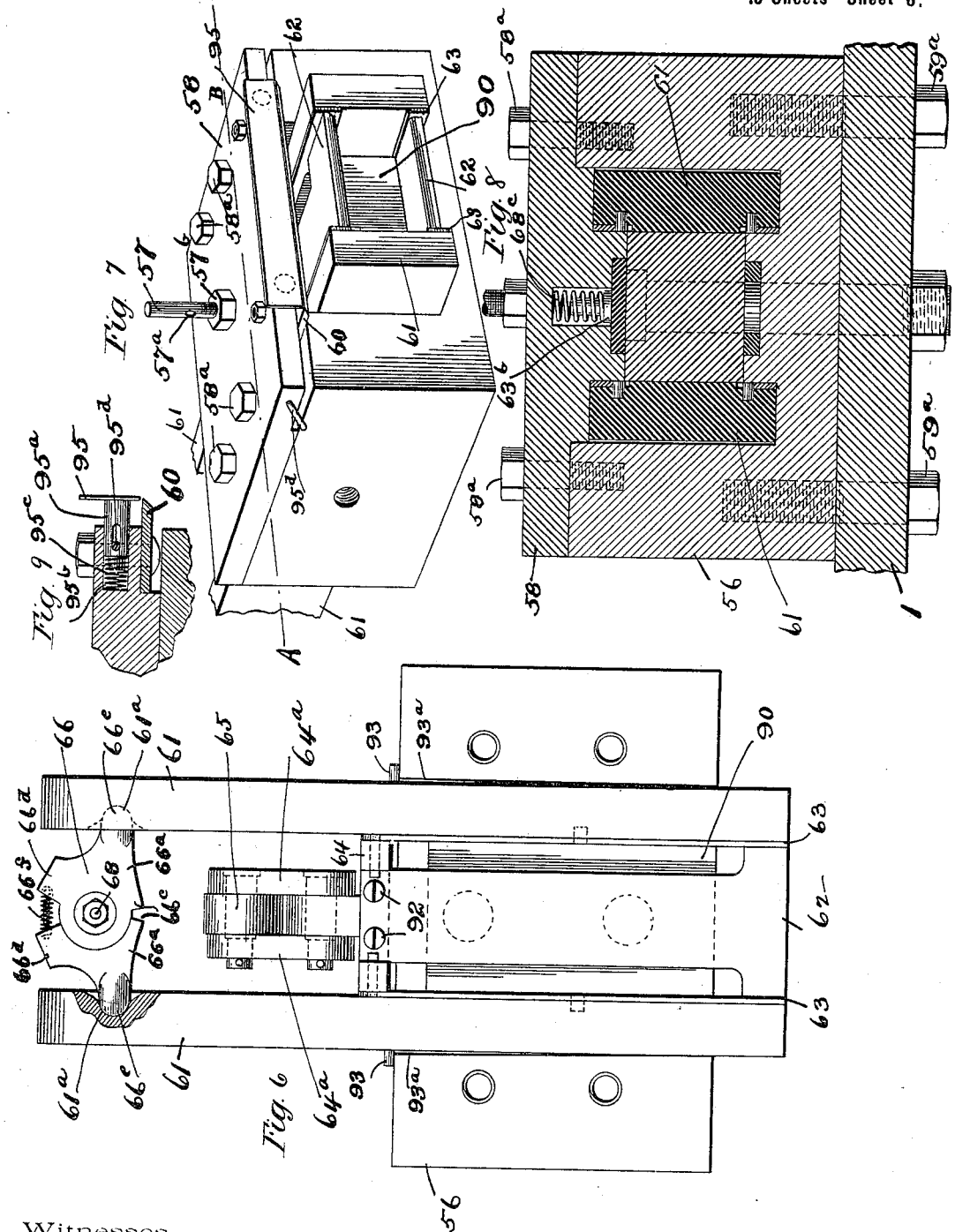

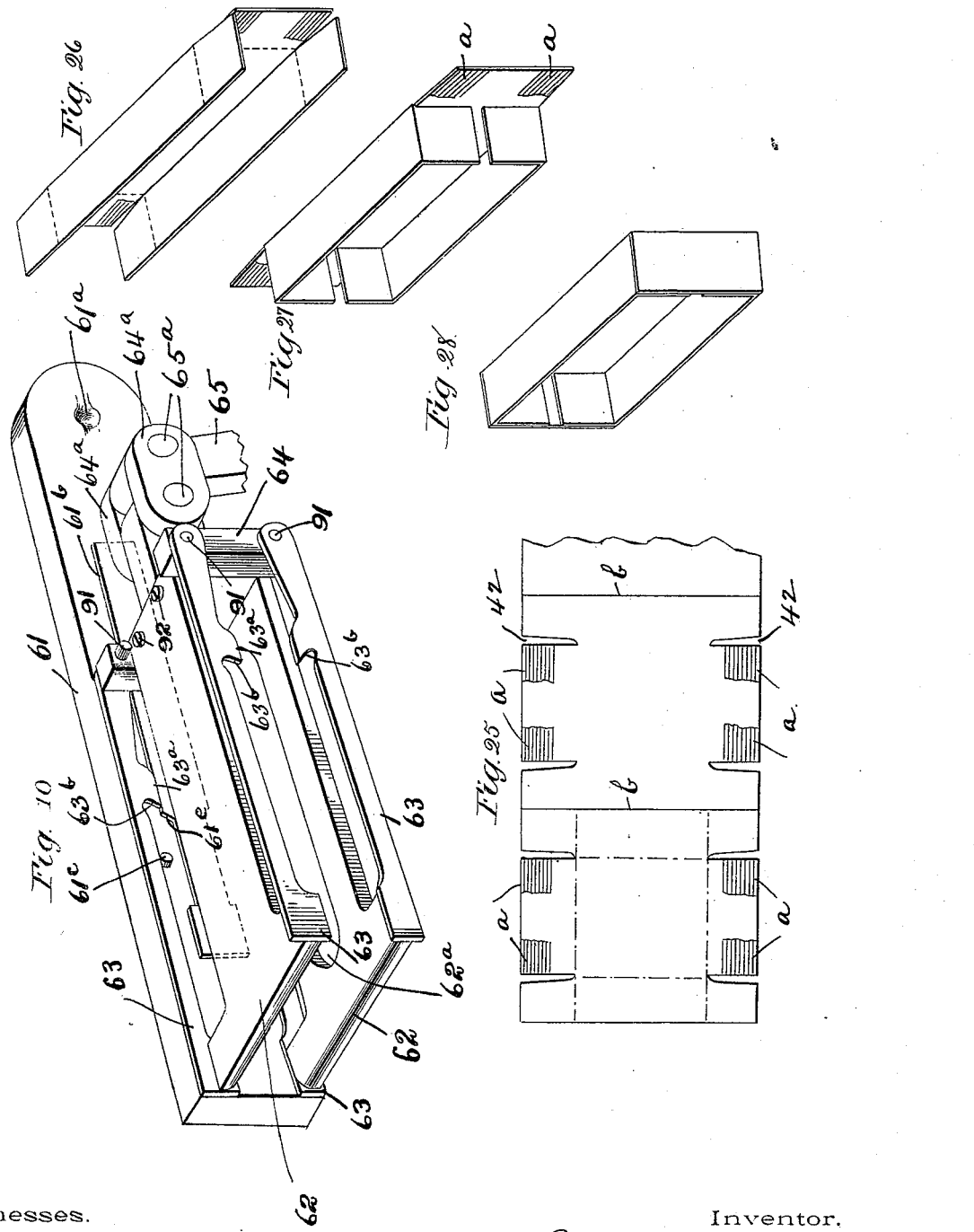

No. 640,171. Patented Jan. 2, 1900.
G. A. BARNES.
BOX MACHINE.
(Application filed Sept. 10, 1898.)
(No Model.) 10 Sheets—Sheet 8.
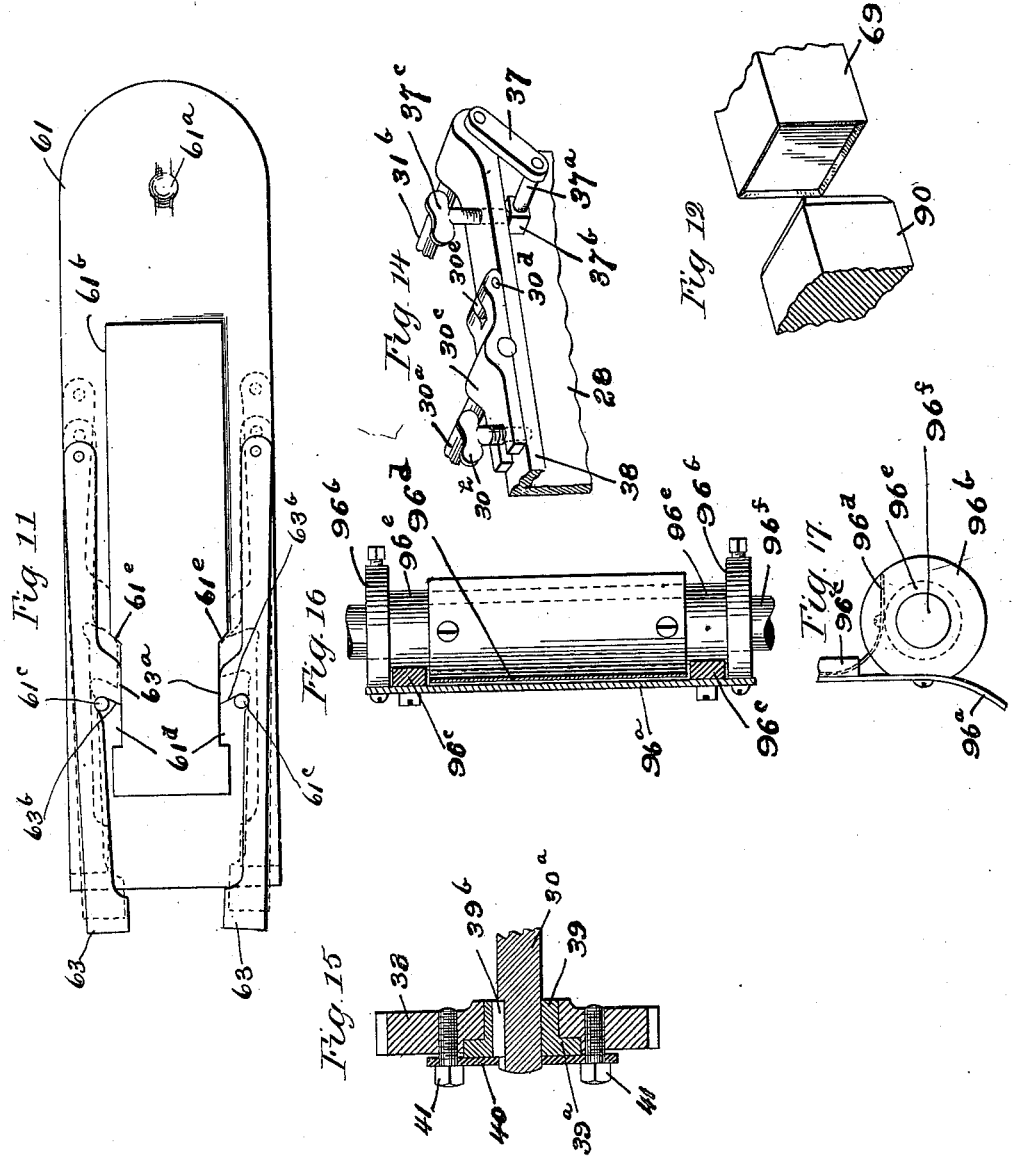
Witnesses.
Inventor.
George A. Barnes
by Chapman & Hall
Attorneys No. 640,171. Patented Jan. 2, 1900.
G. A. BARNES.
BOX MACHINE.
(Application filed Sept. 10, 1898.)
(No Model.) 10 Sheets—Sheet 9.
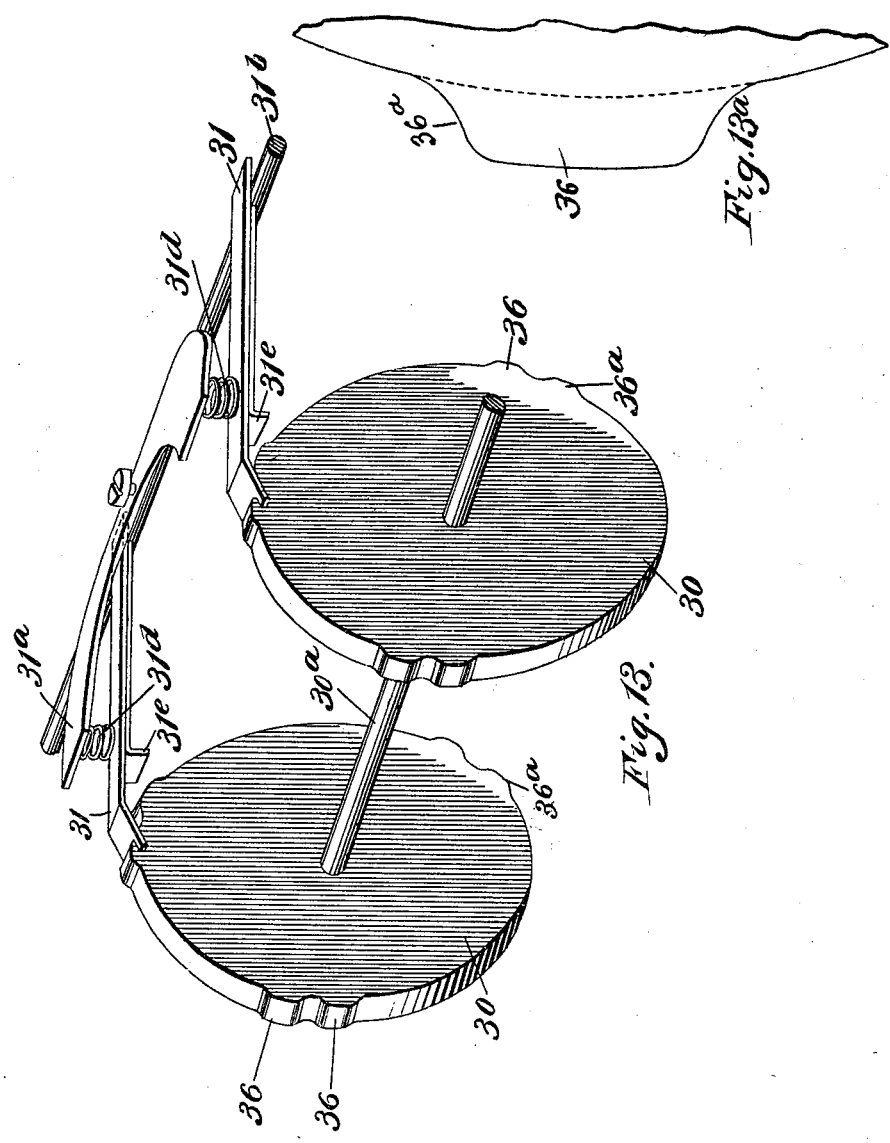

No. 640,171. Patented Jan. 2, 1900.
G. A. BARNES.
BOX MACHINE.
(Application filed Sept. 10, 1898.)
(No Model.) 10 Sheets—Sheet 10.
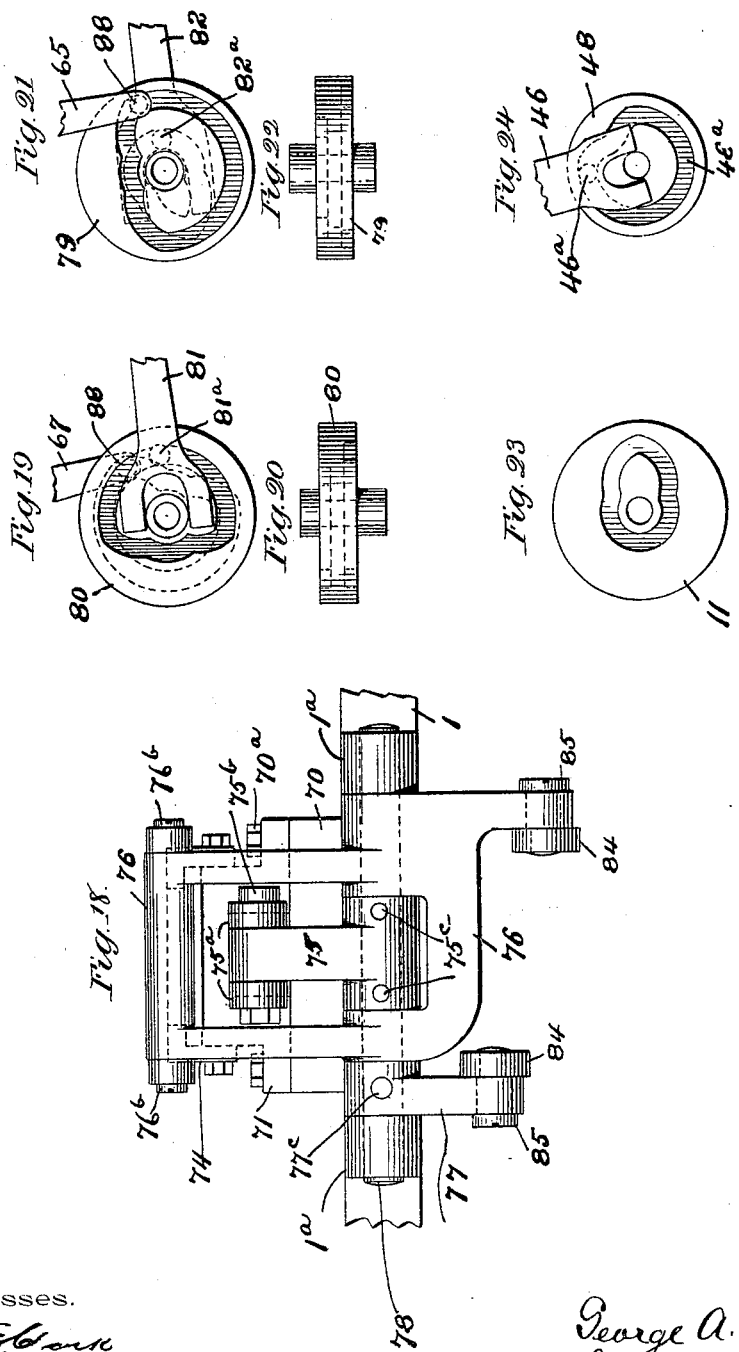
Witnesses.
W. E. Clark
Edwin M. Clark
Inventor.
George A. Barnes
by Chapman & Hall
Attorneys

UNITED STATES PATENT OFFICE.

GEORGE A. BARNES, OF NEW HAVEN, CONNECTICUT.

BOX-MACHINE.

SPECIFICATION forming part of Letters Patent No. 640,171, dated January 2, 1900.

Application filed September 10, 1898. Serial No. 690,652. (No model.)

*To all whom it may concern:*

Be it known that I, GEORGE A. BARNES, a citizen of the United States, residing at New Haven, in the county of New Haven and State of Connecticut, have invented certain new and useful Improvements in Box-Machines, of which the following is a specification, reference being had therein to the accompanying drawings.

The invention is an improvement in machines for making paper boxes, pertaining more especially to that type of machine which is designed to automatically convert a continuous strip or web of paper which is fed to the machine into a series of such boxes.

My improved machine comprises, first, any proper and conveniently-located device for supplying a long strip or web of paper or similar material which is to be made up into boxes; second, a device for applying to the said strip or web an adhesive substance at definite points; third, a feed mechanism for drawing the strip or web from the supplying-roll and causing it to pass through the machine at proper intervals and at a rate proportionate to the speed at which the machine is driven; fourth, a device for cutting or punching out portions of the strip to enable it to be properly folded; fifth, a cutting mechanism for dividing the continuous web of paper into sections or blanks each of the exact size necessary for a box of given dimensions, and, lastly, a folding mechanism which transforms the said sections or blanks into boxes.

The particular features of novelty which distinguish the invention may be more readily indicated by the following general statement of the part which each of the more important elements above enumerated performs in the operation of the machine.

By the instrumentality of the feed mechanism the strip or web of paper is drawn off from a supply-reel and around a suitable cylinder or roll over a reservoir of glue. Special devices operate to apply to those portions of the paper which subsequently form the ends of the boxes and which are brought together by the folding mechanism extremely thin and evenly spread layers of the glue. The paper is advanced intermittently through the punching mechanism to the devices which divide it up into sections and fold the sections into boxes. During the periods of rest of the feed mechanism, which coincide with the periods of operation of the folding mechanism, the punches cut from the edges of the web inward narrow strips to relieve the corner folds, and as thus prepared the web reaches the folding mechanism. When the proper length of web has been supplied to the folding mechanism, a former-plunger of the exact dimensions of the interior of the box advances toward the paper and binds it against a stationary rigid bottom block. A cutting device then severs the section to be folded from the main web, and while the severed section is retained in position by the pressure of the former-plunger double sets of folder-plates advance and successively fold the sides and ends of the blank over the said former and compress the folded end portions. The several parts of the folding mechanism then resume their normal positions ready to operate on the next section or blank, and the completed box by the withdrawal of the plunger is dropped out of the machine through a suitable opening.

The more important features in the machine as thus organized which are of my invention are the following:

First. The surfaces which take up the adhesive material from the reservoir and apply it to the paper are so arranged that no glue in excess of the minimum quantity actually demanded is transferred to the paper. For this purpose there are used in connection with the glue-rolls scrapers or wipers which pass not only over those portions of the rolls which come into direct contact with the paper, but over all adjacent surfaces upon which glue could collect in such manner as to be deposited upon the paper. In other words, the scrapers or wipers are in uninterrupted contact with the peripheral and adjacent surfaces of the gluer-rolls whatever the conformation of these may be and by whatever means they are caused to intermittently apply the glue to the paper.

Second. The folding of the blanks or sections of web into boxes is effected by independently and successively operating folder plates or blades which advance through a stationary guide-block and which sliding in contact therewith bend and press the edges and ends of the blanks around a former-plunger, which binds or clamps the central portion of the blank against a stationary bottom block.

In addition to these chief features of the invention the machine embodies novel details which I have devised for more effectively carrying out the objects of my invention and which will be more particularly hereinafter specified in the specification and claims.

In the drawings hereto annexed the details of the machine above generally described are illustrated.

Figure 1 is a plan view; Fig. 2, a side elevation, and Fig. 3 an elevation of the rear end of the machine. Fig. 4 is a vertical section on line A B of Fig. 1. Fig. 5 is a vertical section on line C D of Fig. 1. Fig. 6 is a plan view of a portion of the folder mechanism. Fig. 7 is a perspective view of the same. Fig. 8 is a vertical section on line A B of Fig. 7. Fig. 9 is a sectional view of a portion of the mechanism employed for dividing the paper web into sections. Fig. 10 is a perspective view of one part or element of the folding mechanism with one of the folding-plates removed. Fig. 11 is a side elevation of one of the end-folder plates, showing the several positions of the corner-folders in relation thereto. Fig. 12 is a perspective view of portions of the former-plunger and bottom block, showing a modification of the same. Fig. 13 is a perspective view of the gluer-rolls and scraper mechanism, and Fig. 13$^a$ an enlarged view of a portion of one of the rolls. Fig. 14 is a perspective view of a tension-adjusting device used in connection with the gluer-rolls. Fig. 15 is a sectional view of a gear-adjusting device for the same. Figs. 16 and 17 are views of detached parts of the guide-frame of the machine. Fig. 18 is an end elevation of the lever mechanism for operating the cutting mechanism and one of the elements of the folding mechanism. Figs. 19, 20, 21, 22, 23, and 24 are views of the several operating-cams used in the machine. Fig. 25 is a plan view of the paper strip or web in the condition in which it reaches the folding mechanism. Figs. 26, 27, and 28 illustrate the different conditions of the blanks after the several operations of the folding mechanism.

The numeral 1 designates the bed of the machine; 2, the legs; 10, the main driving-shaft; 15 15$^a$, the hangers; 102, the balance-wheel; 103, the driving clutch-pulley; 104, the clutch-sleeve; 105, the clutch-lever, pivotally secured at one end to the bracket 106, bolted to the leg; 3, the table; 4 and 4$^a$, the uprights; 5, the upper and 6 the lower feed-roll. Roll 5 is keyed upon the shaft 5$^a$, which rotates in the boxes 5$^b$ 5$^b$ at opposite ends of the said shaft, the said boxes being mounted in the housings 5$^c$ 5$^c$, which are bolted to the top of the table 3 by the stud-bolts 5$^d$ 5$^d$. Roll 6 is beneath the table 3 and keyed to the shaft 6$^a$, which is journaled in the uprights 4 and 4$^a$, the table 3 being cut away at 7, so that a portion of the periphery of the roll will be substantially flush with the top of the table. A vertical adjustment is given the roll 5 by the thumb-screws 8 8, which are threaded in the caps 9 9 and bear upon the top of the boxes 5$^b$ 5$^b$, the boxes being supported by the round-headed screws 8$^a$, which are adjustable in the bottom of the said housings.

The intermittent motion of the feed-rolls is derived through the mechanism now to be described.

The numeral 11 designates the feed-cam, fixed to the shaft 10; 12, the sector, in the form of a bell-crank, one end of which is provided with gear-teeth and the other with a cam-roll 13, the said sector being fulcrumed at its center upon the pin 14, held rigid in the hanger 15; 16, the intermediate gear, meshing into the sector 12 and loosely mounted on the stud 17, fastened to the upright by the nut 17$^a$; 18, the pawl-carrier, having gear-teeth cut in a portion of its outer surface and loosely mounted upon the end of the shaft 6$^a$, inside the collar 19 and nut 20; 21, the pawl, hung upon the pin 22, secured to the pawl-carrier 18 by the nut 21$^a$; 23, the ratchet-disk, fixed to the shaft 6$^a$ and provided with ratchet-teeth 23$^a$ and a like number of peripheral recesses 23$^b$, and 24 the retaining-hook, hung upon the stud 24$^a$ in the upright 4.

As the shaft 10 and feed-cam 11 rotate, the sector 12 is caused to swing upon the pin 14, according to the position of the cam-roll 13 in the groove of the cam, the sector remaining idle while the cam-roll is in that portion of the groove which is concentric to the shaft and operating while the cam-roll is traveling through the remainder of the groove. The swinging of the sector 12 imparts a partial rotary movement to the pawl-carrier 18 through the intermediate gear 16. As the pawl-carrier rotates, the pawl 21 catches against one of the ratchet-teeth upon the ratchet-disk 23 and carries with it during its partial rotation the disk 23 and shaft 6$^a$.

The rolls 5 and 6 are preferably hollow, and in many cases it is desirable to coat them with rubber, and they are connected with each other by the spur-gears 25 and 25$^a$, fixed, respectively, to the shafts 5$^a$ and 6$^a$.

It is essential to the operation of a machine of this character that the paper fed to the forming mechanism should be exactly long enough to form a single box and no more or less, and to insure the continued feeding of successive strips of exactly the same length I have provided the retaining-hook 24, the hook-end 24$^b$ of which is held against the periphery of the ratchet-disk 23 by the spring 27 and drops into the recesses 23$^b$ when the same are brought into register therewith. Trip-plate 26 is loosely fixed upon the shaft 6$^a$, between the upright 4 and the ratchet-disk 23, and connected with the pawl-carrier 18 by the pin 22, the end of which passes through the hole 26$^a$ in the said plate. The trip-plate 26 and pawl-carrier 18 operate together, and as the pawl-carrier and trip-plate are brought to their stationary positions (see Fig. 2) the rounded corner $26^b$ of the trip-plate 26 engages the rounded hook-end $24^b$ of the retaining-hook and forces it out of the peripheral recess in the ratchet-disk 23 upon the circular edge $26^c$, where it remains idle until the plate is again rotated and carried away from the hook, when the spring 27 holds it against the periphery of the disk 23.

Fig. 2 illustrates the several positions of the feed-roll mechanism when the rolls are at rest, the hook 24 being out of engagement with the recesses $23^b$. The circular edge $26^c$ of the trip-plate is long enough to hold the hook 24 out of engagement with any of the recesses $23^b$ until they have passed the hook end $24^b$. The operation of this mechanism is as follows: The pawl-carrier is given a partial rotation, as hereinbefore described. The pawl catches against one of the teeth of the ratchet-disk, thereby imparting the partial rotation to the feed-rolls, the trip-plate holding the hook away from the periphery of the ratchet-disk until the peripheral recess has passed, when the spring 27 pushes the hook against the face of the said disk. The rotation continues until sufficient paper has been fed into the folding mechanism, when the hook end $24^b$ drops into one of the peripheral recesses $23^b$, immediately checking the rotation of the rolls and preventing their momentum from rotating them further. The hook remains engaged with the ratchet-disk until the box is formed and while the pawl-carrier is returning to its original position, when it is forced out of the recess by the trip-plate in the manner before described.

The gluer mechanism comprises a water-tank 29, fastened to the bed of the machine by the brackets $29^a$, gluer-trough 28, secured above the water-tank, gluer-rolls 30 30, fixed to a gluer-shaft $30^a$, which is journaled at either end in bearings $30^b$ $30^b$, provided with the hinged caps $30^c$ $30^c$, scrapers 31 31, and spring-plate $31^a$, fastened to the scraper-bar $31^b$, held at either end in the lugs $31^c$ $31^c$, integral with the trough 28 and coil scraper-springs $31^d$ $31^d$. Fixed to the shaft $6^a$ is the spur-gear 32, which is connected with the gluer-actuating gear 33 through the intermediate gears 34 and 35. Gear 34 is loosely mounted upon the stud $34^a$, screwed into the upright $4^a$, and gear 35 is free to rotate upon the stud $35^a$, screwed into the bracket $35^b$, secured to the same upright. Upon the periphery of the gluer-rolls are a plurality of integral gluer-pads 36, the ends of which slope gradually, as at $36^a$, to the face of the roll, which pads pick up the glue in the trough and are brought into contact with the paper strip by the rotation of the rolls.

In gluers heretofore made it has been impossible to use a common glue of a coarse body and prevent a lump of glue from forming at either end of the pad. To overcome this difficulty, I have provided the gluer-rolls with a periphery without abrupt or angular changes in contour, and there are employed the scrapers 31 31, which have an open end, so as to scrape the entire periphery of the rolls and that portion of the sides immediately adjacent thereto.

The lower portions of the gluer-rolls 30 30 are immersed in the liquid glue in the trough 28, and said rolls are rotated simultaneously with the feed-rolls 5 and 6 in the direction of the arrow in Fig. 13 through the spur-gears 32, 33, 34, and 35. As the rolls rotate they carry with them a quantity of the glue from the trough, and the scrapers 31 31, which are held constantly against the periphery of the gluer-rolls by the springs $31^a$ $31^a$, remove substantially all of the glue from the face of the rolls, which drops back into the trough. A shield $31^e$ $31^e$ upon the under side of the scrapers prevents the glue from running down the under side thereof and hardening upon the scraper-bar. Just sufficient glue remains on the pad to make a thin light deposit upon the paper strip when the pad is brought into contact therewith. It is clear that as the scrapers follow the contour of the gluer-rolls all of the surplus glue will be removed from the face thereof and no glue can form in the corners of the gluer-pads. The method of heating the water in the tank 29 for liquefying the glue is not shown or described, it not being essential to my invention, as any of the methods common to the art may be used.

To regulate the quantity of glue to be deposited upon the paper, I have designed the tension device for regulating the tension of the scrapers upon the face of the rolls. This device (see Fig. 14) comprises the arm 37, fastened securely to the scraper-bar $31^b$, the swivel-pin $37^a$, with the flat head $37^b$, and the thumb-screw $37^c$, threaded in the overhanging ledge 38 of the glue-trough. By adjusting the thumb-screw $37^c$ the desired tension of the scrapers on the glue-rolls may be acquired, and a greater or less quantity of glue will remain on the pads after they have passed the scrapers, according to the tension thereof.

In Fig. 15 is illustrated a section of the mechanism for adjusting the position of the gluer-rolls so that the glue deposit upon the paper strip can be located in the desired position.

The numeral 39 designates a collar fixed to the shaft $30^a$ by the key $39^b$ and having the integral shoulder $39^a$, upon which collar is loosely mounted the gear 33; 40, the retaining-disk, and 41 41 the key-bolts. It will be borne in mind that the relative positions of the gears 33 and 32 are permanent and that only the position of the gluer-shaft $30^a$ can be changed in relation to the gear 32. By unscrewing the bolts 41 the gluer-shaft $30^a$ can be turned freely and brought to any position in relation to the gear 32, after which by tightening the bolts 41 the pressure of the retaining-disk 40 against the head of the collar 39 is sufficient to hold the gluer-shaft permanently in its adjusted position.

For convenience in removing the gluer rolls and shaft from the trough, the caps 30$^c$ 30$^c$, Figs. 1 and 2, are hinged by the pins 30$^d$ 30$^d$ to the integral ears 30$^e$ 30$^e$ upon the overhanging ledge of the gluer-trough and held in their normal positions by the thumb-screw 30$^h$ 30$^h$.

By my gluer mechanism above described I am enabled to use a common cheap glue of a coarse body and can regulate the amount and position of the glue deposited on the paper strip to the exact quantity or position desired, the glue deposit also being of a uniform thickness, without lumps or heavy deposits at either end.

The slits 42, Fig. 25, which are cut in the strip to admit of the folding thereof, are made by the punches 43 43 and die 44, Figs. 4 and 5, immediately after the strip has passed through the feeding-rolls, the feed-rolls now being stationary and the folding mechanism operating upon the blank. The punches 43 43 are bolted to the punch-holder 43$^a$, and the slight vertical adjustment required to take up the wear caused by regrinding is accommodated by the set-screws 43$^b$ 43$^b$.

Punch-holder 43$^a$ derives its up-and-down movement upon the posts 45 45 from the cams 48 48 through the pitmen 46 46, Figs. 5 and 24, pivotally connected at their upper ends to the said punch-holder by the swivel-pins 47 47 and provided at their lower yoke ends with the cam-rolls 46$^a$ 46$^a$, which travel in the irregular groove 48$^a$ of the said cams. The die 44 is embedded in the table 3, with its upper face flush with the top of the table, and fastened beneath the said table, conveniently near the punch-holes in the die 44, is the sheet-metal chute 49, which guides the cuttings from the punches through the hole 50 in the bed of the machine into a receptacle placed to receive them.

51 designates the guide-table, which is pivotally secured to the ears 52 52 of the table 3 by the pintle 53, the top surfaces of both of said tables being substantially flush with each other, Figs. 1, 2, and 4. The front end of the guide-table is rounded at 51$^a$ to guide the paper strip vertically into the folding mechanism. Upon the upper side of said table are screwed the side guides 54 54, which are angular in cross-section and support the tie-bars 54$^a$ 54$^a$, upon the under side of which is secured the top guide 54$^b$, which consists of a flat sheet of metal and extends from a point adjacent to the punches around a portion of the rounded end 51$^a$. The rounded end 51$^a$ is suspended above the machine by the straps 55 55, Fig. 2, pivotally secured at their top ends to the table by the screws 55$^a$ 55$^a$ and at their lower ends to the guide-block 56 by the screws 55$^b$ 55$^b$, which pass through the elongated slot 55$^c$.

57 designates an adjustable post for supporting the guide-table, which post is threaded in the cap 58 at its lower end. The post 57 is rotated by inserting a pin in the hole 57$^a$ and locked in any of its adjusted positions by the check-nut 57$^b$.

The strip is drawn by the feed-rolls through a vertical guide-frame 96, Figs. 3 and 4, over a plate 97, between the pressure-roll 98 and the gluer-rolls 30 30, over an auxiliary guide-table 99, and between side guides 100 and pushed by the said feed-rolls over the die 44, guide-table 51, under the top guide 54$^b$ and between the side guides 54 54, and over the rounded end 51$^a$, where it is presented to the folding mechanism. The vertical guide-frame 96 is constructed of a sheet-metal back 96$^a$, bent outward at the bottom end and fastened by screws to the collars 96$^b$ 96$^b$. Upon either side of the center of said back 96$^a$ are secured metal bars 96$^c$ 96$^c$, forming side guides, and between the said bars is the spring-plate 96$^d$, screwed to the collar 96$^e$. Spring-plate 96$^d$ holds the paper strip against the back of the guide 96 and prevents sagging and buckling. Collars 96$^b$ and 96$^e$ are made fast to a round bar 96$^f$, which is bolted to the leg of the machine by tap-bolts 96$^g$ 96$^g$. Above the gluer-rolls is the pressure-roll 98, which forms a backing for the said gluer-rolls as they are brought into contact with the paper strip and which is preferably made of rubber or other resilient substance. The said pressure-roll is free to rotate by the friction of the paper strips over it upon the stationary shaft 98$^b$, between the flanged collars 98$^a$ 98$^a$, made fast to said shaft. The shaft 98 is hung in the overhanging arms 101, which are bolted to the under side of the table 3, and has a limited vertical adjustment in relation thereto to vary the pressure on the gluer-rolls by means of the set-screws 101$^a$, which hold the said shaft within the slot 101$^b$.

I will now describe that portion of the mechanism which takes the strip and folds it into the completed box.

In Fig. 25 the strip is illustrated as presented to the folding mechanism ready to be folded into a box, the letters $a$ $a$ designating the glued portions.

The numeral 56, Figs. 5, 6, 7, and 8, designates the guide-block, having the central portion cut away for the folders and secured to the bed of the machine by the bolts 59$^a$ 59$^a$; 58, the cap which is fastened to the guide-block by the cap-screws 58$^a$; 60, the stationary knife fixed to the under side of the cap 58; 61 61, the end-folders; 62 62, the side-folders; 63, the corner-folders; 90, the bottom block; 90$^a$, the headed rod-bolts which pass through the blocks 56 and 90 and hold the bottom block rigid; 90$^b$, the nuts on the ends of the bolts 90$^a$; 64, the folder-head; 65, one of the folder-levers; 64$^a$, the links which connect the lever 65 with the folder-head 64; 65$^a$, the swivel-pins for joining the links 64$^a$ with the folder-head 64 and the lever 65; 66, the toggle-joint for operating the end-folders;

67, the end-folder lever, and 68 the swivel-pin which pivotally secures the said yoke to the end of the lever 67.

Levers 65 and 67, Figs. 4, 19, and 22, are loosely fulcrumed about midway of their length upon the shaft 87 and are caused to oscillate upon the said shaft by the cams 79 80, there being a cam-roll 88 88 upon each of the said levers which follows the groove in their respective cams. The hangers 89 89, which are bolted to the under side of the bed 1 upon either side of the said levers, hold the shaft 87 in its fixed position.

The toggle-joint 66, Figs. 4 and 6, is composed of the two members $66^a$ $66^a$, joined together by a knuckle-joint and kept in their normal positions by the spring $66^f$. Each of said members is provided with a stop-lug $66^c$ and a spring-lug $66^d$. Through the center of the said members is the swivel-pin 68, which holds them together, the shank portion of the said pin fitting freely within the hole $67^a$ in the end of the lever 67. The rounded ends $66^e$ $66^e$ of the said members are embedded in the semicircular recesses $61^a$ $61^a$ in the end-folders, the ends and recesses being semicircular, so that a practically universal joint may be acquired. The four corner-folders 63 are pivotally secured at their rear ends to the folder-head 64 by pintles 91, the inner edges of the strip-catches $63^a$ resting against the ledge $61^b$ of the end-folders, with the outer end substantially flush with the front end of the side-folders 62 62.

The side-folders 62 62 are T shape, the head portion being substantially the width of the side of the box and the inner front edges of which are rounded to prevent tearing the paper when the folders are brought into contact therewith. The body portion of each of the said folders is secured at its rear end to the folder-head 64 by the screws 92 and slides within recesses formed in the cap 58 and guide-block 56. (See Fig. 8.) A friction-plug $63^b$, kept in contact by the coil-spring $63^c$ with the upper side-folder, holds it against the top of the bottom block, but allows it to be pushed upward slightly to accommodate the paper-stock if it should vary slightly in thickness. An elongated slot $62^a$ is cut through the body portion of the lower side-folder to permit the bolts $90^a$ to pass therethrough.

69 designates the former-plunger; 70, the guide-frame base, secured to the bed of the machine by the tap-bolts $70^a$; 71, the guide-frame within which the former-plunger is fitted; 72, the reciprocating knife; 73, the knife-slide; 74, slide-caps; 75, the former-plunger crank-arm; 77, the fulcrum-shaft crank-arm; 76, the knife-lever; $75^a$, the links connecting the crank-arm 75 with the former-plunger 69; $76^a$, the links connecting the lever 76 with slide 73, and $75^b$ and $76^b$ the screws and bolts, respectively, for securing the links $75^a$ and $76^a$ in their operative positions. The crank-arms 75 and 77 are keyed by the pins $75^c$ $77^c$, and the lever 76 is fulcrumed and free to rotate on the shaft 78, which is journaled at either end in the integral ears $1^a$ $1^a$.

Motion is imparted to the former-plunger and knife from the cams 79 80 through the connecting-rods 81 82, each of which is provided with a cam-roll $81^a$ $82^a$, fitted into the groove of their operating-cams. The said connecting-rolls are constructed of a flat metal bar having one yoke end to straddle the shaft 10 and a rounded end for the threaded adjusting-rods 83 83, which unite the swivel-blocks 84 84, that are pivotally joined to the crank-arm 77 and lever 76 by the studs 85 85. To adjust the movement of the former-plunger 69 and knife-slide 73, the jam-nuts 86 are loosened, and the threaded rods 83 83 are turned until the exact movement is determined, when the jam-nuts are tightened and the parts are again locked together.

The operation of the folding mechanism is as follows: The glued strip, having the notches cut therein, as shown in Fig. 25, is fed over the rounded end $51^a$ of the adjustable table and is presented in front of the bottom block 90 in a vertical position, the four corners of the bottom block being even with the inner ends of the said notches. The former-plunger 69, which is the same size as the inside of the box, now advances and holds the blank rigidly against the bottom block. By a quick stroke of the slide 73, which follows immediately after the former-plunger has come in contact with the blank, the blank is severed from the strip on line $b$, Fig. 25, between the reciprocating knife 72 and the stationary knife 60. The folders remain stationary during these operations, the front ends of all of them being slightly to the rear of the face of the bottom block, their relative positions being illustrated in Fig. 10, the trip-catches $63^a$ of the corner-folders being upon the ledge $61^b$ of the end-folders. All of the side and corner folders operate together in their longitudinal movement, they being secured to the common folder-head 64. These folders now start forward, the side-folders taking the blank first and turning the sides thereof over upon the outside of the former-plunger. The blank after this operation is shown in Fig. 26. During this operation the corner-folders have moved forward, with the trip-catches sliding along the ledge upon the side of the end-folders, which are now stationary. Simultaneously with the completion of the side folds the rearwardly-inclined edge $63^b$ of the trip-catch is brought into contact with the pin $61^c$ in the end-folders, the front end of the corner-folders being over the corner-flaps of the box. As the advance movement of the folders continues the pins $61^c$, sliding over the inclined edges $63^b$, force the front ends of the corner-folders toward each other (see full lines in Fig. 11) and fold the corner-flaps over the sides of the former-plunger. The condition of the blank after this operation is shown in Fig. 27. After the corner-flaps have been folded the end-folders begin to move forward by means of the lever 67 and the toggle-joint connection 66, the corner and side folders remaining stationary, holding the incompleted box upon the plunger-former 69. The end-folders have just taken hold of the end flaps and folded them over sufficiently to prevent the corner-flaps from springing away from the former-plunger when the edge $61^c$ of the recess $61^d$ is brought into contact with the rear edge of the trip-catch $63^a$, (see dotted lines in Fig. 11,) and by the continued forward movement of said end-folders the corner-folders ride out of the said recess into the ledge $61^b$, being brought thereby to their original positions, and the forward ends thereof are lifted away from the box and out of the path of the end-formers. The end-formers continue to move forward and fold the end flaps over upon the corner-flaps until the stop-pins 93 abut against the rear face of the guide-block 59. (See Fig. 6.) The lever 67, however, does not stop its oscillating movement; but the forward movement of the end-folders being checked the toggle-joint opens and spreads the rear ends of the said folders apart and draws the front ends toward each other. By drawing the front portions of the end-folders toward each other the end and corner flaps are given a final additional pinch after the folding has been completed, which sets the glued portions together more securely. The sides $93^a$ $93^a$ of the recess in the guide-block are made converging from the front to the rear to accommodate this spreading action of the end-folders. The side, corner, and end flaps being folded, the box is completed, and all of the folders withdraw to their original positions, leaving the completed box upon the end of the former-plunger, which now begins to recede. The box is stripped from the plunger as it recedes by the face of the guide-frame 71 and base 70, after which it drops through the hole 94 in the bed into a receptacle conveniently located to receive it. When the end-folders are being withdrawn and returned to their original positions, the stop-lugs $66^c$ $66^c$ are brought together, and thereby prevent the rounded ends $66^e$ $66^e$ from being drawn out of their rounded socket-seats in the end-folders.

To prevent the end of the severed strips from catching upon the stationary knife 60, I have provided a spring-stripper, which comprises a stripper-plate 95, the front face of which projects slightly over the edge of the said knife, plugs $95^a$, fastened to said stripper-plate and fitted loosely within holes $95^b$ in the front face of the caps 58, coil-spring $95^c$, surrounding a portion of each of said plugs and housed within the said hole, and locking-pins $95^d$, made fast in the said cap 58 and passing through the longitudinal slots in the body of said plugs. It is apparent that when the stripper-plate is pushed back by the reciprocating knife the springs $95^c$ will force it out to its original position, and with it the paper strip, which passes down in front when the said knife recedes.

By unloosening the screws $55^b$ $55^b$ and turning the adjustable post 57 the front end $51^a$ of the guide-table can be raised or lowered, thereby shifting vertically the position of the strip which passes over it in relation to the knives. I am enabled by such adjustment to present the blank to the knives and folding mechanism in any desired position.

Boxes are commonly made with a slight depression in the bottom to prevent the sides from spreading outward, and in my machine I can accomplish this object by making the edges of the face of the former-plunger raised, thereby leaving a central panel, (see Fig. 12,) and by cutting off the edges of the bottom block to fit into the recessed face of the said plunger.

There are many minor changes and alterations that can be made within my invention, and I would therefore have it understood that I do not limit myself to the exact construction herein shown and described, but claim all that falls fairly within the spirit and scope of my invention.

Having fully described my invention, what I claim as new, and desire to secure by Letters Patent, is—

1. In a machine of the character described, the combination of a roll having a pad or raised portion thereon with rounded or sloping ends, and adapted to intermittently take up glue and deposit it on the paper, of a scraper adapted to pass over the face of said pad and those portions of the surface adjacent thereto, and in unbroken contact therewith, and thereby remove the excess of glue both from the face of the pad and the surfaces adjacent thereto, as herein set forth.

2. In a machine of the character described, the combination of a rotary gluer-roll having upon its periphery raised portions or pads with rounded or sloping ends, and a spring-scraper bearing against the periphery of said roll and adapted to remain in uninterrupted contact with the periphery and adjacent surfaces of said roll, as set forth.

3. In a machine of the character described, the combination of an intermittently-revoluble gluer-roll having upon its periphery raised portions or pads with rounded or sloping ends, and a spring-scraper bearing against the periphery of said roll and adapted to remain in uninterrupted contact with the periphery and adjacent surfaces of said roll, as set forth.

4. In a machine of the character described, the combination of gluer-rolls having upon their peripheries raised portions or pads with rounded or sloping ends, scrapers bearing against the peripheries of said rolls and maintaining uninterrupted contact with their peripheries and the adjacent surfaces, means for intermittently rotating said rolls and means for adjusting the position of the said rolls in relation to the paper-carrying roll, as set forth.

5. In a machine of the character described, the combination with gluer-rolls having upon their peripheries raised portions or pads with rounded or sloping ends, scrapers bearing with uninterrupted contact upon the peripheries and adjacent surfaces of said rolls, and means for regulating the pressure of the scrapers upon the peripheral surfaces of the rolls, as set forth.

6. In a machine of the character described, the combination of gluer-rolls having upon their peripheries raised portions or pads with rounded or sloping ends, a shaft carrying said rolls, means for intermittently rotating the shaft, scrapers bearing with uninterrupted contact upon the peripheries and adjacent surfaces of said rolls, a bar to which said scrapers are attached, and a tension-adjusting device consisting of an arm fixed to said bar, a swivel-pin pivotally secured to said arm and a thumb-screw adapted to depress said arm by contact with said swivel-pin, substantially as set forth.

7. In a machine of the character described, the combination of gluer-rolls having projections or pads on its periphery, the said pads being of the same width as the rolls with faces concentric with the axis of the rolls, and having rounded or sloping ends, of spring-scrapers adapted to bear with uninterrupted contact on the peripheral face of the rolls and the sides adjacent thereto, as set forth.

8. In a machine of the character described, in combination with the blank-folding mechanism, a guide-table pivotally secured at its rear end, the front end of which is bent downward to change the path of travel of the paper strip from a horizontal to a vertical, and means for adjusting vertically the front end of said table, substantially as set forth.

9. In a blank-folding mechanism for a machine of the character described, the combination of a bottom block, a reciprocating former-plunger, reciprocating side-folders and end-folders adapted to move longitudinally through guides around the bottom block and along the sides of the former-plunger in sliding contact with the under surface of the sides and ends respectively of the blank, as set forth.

10. In blank-folding mechanism for a machine of the character described, the combination of a bottom block, a reciprocating former-plunger, longitudinally-movable side-folders and end-folders adapted to pass along the sides of the former-plunger in sliding contact with the under surface of the sides and ends of the blank, and means for independently and successively advancing the side and end folders while the former-plunger is at rest, as set forth.

11. In blank-folding mechanism for a machine of the character described, the combination of a bottom block, a reciprocating former-plunger, longitudinally-movable side-folders and end-folders, corner-folding blades pivoted to the side-folders and engaging with the end-folders, and means for successively advancing the side and the end folders along the sides of the former-plunger and in sliding contact with the sides and ends of the blank, as set forth.

12. In a machine of the character described, the combination with the stationary bottom block, of a guide-block having a central recess within which is secured the said bottom block, a cap covering said guide-block and inclosing the said bottom block, side and end folders operatively retained within the said guide-block and surrounding the said bottom block, with means for imparting movement to said folders for the purposes set forth, substantially as described.

13. In a machine of the character described, the combination with the former-plunger, of a bottom block, side-folders, means for advancing said folders over the end of said plunger, corner-folders, means for tripping the said corner-folders when the said side-folders have completed their forward movement, end-folders and means for advancing them over the end of said former-plunger not covered by said side-folders, substantially as set forth.

14. In a machine of the character described, the combination with the former-plunger, of a bottom block, side and end folders surrounding said bottom block, means for advancing said folders over the end portion of said plunger and means for drawing toward each other the ends of two of said folders after the said advance movement is completed, substantially as set forth.

15. In a machine of the character described, the combination with the former-plunger, of a bottom block, side-folders, means for advancing said folders over the end of said plunger, corner-folders, means for drawing the ends of the oppositely-located corner-folders toward each other when the said side-folders have completed their forward movement, end-folders, means for advancing them over the end of said former-plunger not covered by said side-folders, and means for raising the corner-folders to their original position before the said end-folders have completed their forward movement, substantially as set forth.

16. In a machine of the character described, the combination with the stationary bottom block and reciprocating former-plunger, of side-folders movable longitudinally along the sides of the former-plunger, corner-folding blades carried by said side-folders and longitudinally-movable end-folders independently operated, and having parts extending into the path of movement of the corner-folders, as set forth.

17. In a machine of the character described, the combination with the bottom block, of side and corner folders, a folder-head to which said folders are secured, means for actuating said folder-head and folders, end-folders, means for actuating said end-folders, means for drawing the ends of the oppositely-located corner-folders toward each other, and means for bringing the same to their original positions before the advance movement of said end-folders is completed, substantially as set forth.

18. In a machine of the character described, the combination with the bottom block, of side corner and end folders, means for actuating the same and means, as a toggle-joint, for drawing the front portions of the said end-folders toward each other, substantially as set forth.

19. In a machine of the character described, the combination with feeding-rolls and means for imparting an intermittent movement thereto, of a bottom block, a guide-block, reciprocating folders passing through slots therein, means for advancing and withdrawing the folders along the sides of the bottom block, a movable former-plunger adapted to be moved toward and away from the said bottom block and cutting-knives for severing the blank from the strip, substantially as set forth.

20. In a machine of the character described, the combination with the bottom block, a guide-block, reciprocating folders, means for advancing and withdrawing the same through the guide-block and a former-plunger operating in conjunction therewith, of a feed-table above said bottom block, having the front end turned outward and devices for adjusting vertically the front of said table, substantially as set forth.

21. In a blank-folding mechanism of the kind described, the combination with a bottom block, a reciprocating former-plunger, a guide-block, reciprocating folders adapted to pass through slots in the guide-block and means for advancing and withdrawing the said folders along the sides of the former-plunger in sliding contact with the sides and ends of the blank, as and for the purposes set forth.

In testimony whereof I affix my signature in presence of two witnesses.

GEORGE A. BARNES.

Witnesses:
GEORGE E. HALL,
EDWIN M. CLARK.